Oct. 4, 1966

G. R. PICKETT ET AL 3,276,533

ACOUSTIC CHARACTER LOGGING

Filed Feb. 25, 1963

INVENTORS:
E. J. KÜNG
G. R. PICKETT

BY: *Theodore E. Bieber*

THEIR ATTORNEY

United States Patent Office
3,276,533
Patented Oct. 4, 1966

3,276,533
ACOUSTIC CHARACTER LOGGING
George R. Pickett, Houston, Tex., and Edward J. Küng, Calgary, Alberta, Canada, assignors to Shell Oil Company, New York, N.Y., a corporation of Delaware
Filed Feb. 25, 1963, Ser. No. 260,674
2 Claims. (Cl. 181—.5)

This invention pertains to acoustical well logging and particularly to an acoustical well logging tool for characterizing earth formations. The tool of this invention is especially useful in providing acoustical logs where the response of the formation to waves that propagate with at least two different velocities is utilized to characterize the formation. This type of log is normally referred to as a character log to distinguish it from the more conventional acoustical logs that provide only information related to waves that propagate with the velocity of compressional waves in the formation.

The present practice in the art of acoustic logging involves in general, measurement of the response of the formation of the rocks surrounding the borehole to compressional waves of sound. These waves in general are those which travel from a transmitter and are the first to arrive at a receiver spaced therefrom. It is known that other acoustic properties that can be measured in the borehole also vary in a manner useful for characterizing formations.

It will be useful at this point to describe the various waves that are propagated within a borehole when an acoustical wave is created therein. If a receiver is positioned at a moderate distance, for example a few feet vertically from a sound source, there will first arrive at the receiver relatively small amplitude waves that travel from the transmitter through the mud, vertically through the borehole formation with the velocity of compressional waves, then back through the mud to the receiver. Somewhat later, will arrive at the receiver a second wave which will hereinafter be called a "shear wave" that travels near the surface of the borehole but travels at the velocity approximately equal to that of shear waves in an infinite body of rock with the same properties. Next there arrives at the receiver a wave that travels directly through the mud and is generally a high frequency wave and is usually not recorded because the frequency is too high to be transmitted with reasonable amplitude over the well logging cables used. Following this direct or fluid wave there arrives a wave which is usually termed a "tube wave." This wave is very large in amplitude, sometimes being for example 10 to 100 times the amplitude of the compressional wave. This wave travels with a very low velocity, lower than that of the fluid within the borehole, and generally has a very low frequency. For example, the frequency of the compressional and shear wave would generally be between 10,000 and 20,000 cycles per second, whereas the frequency of this third wave would generally be below 5,000 cycles per second.

In a copending application of Charles B. Vogel, Serial No. 222,271, filed September 10, 1962, and entitled "Well Logging," there is described and claimed various methods for selectively recording the above-described character waves in a correlatable manner. In addition, the copending application also describes various uses for these waves in determining characteristics of formations surrounding boreholes, as for example determining the compressibility, density and rigidity of the earth materials surrounding the borehole as well as the accuracy of velocity logs.

While the above-referenced copending application of C. B. Vogel describes various methods and apparatus for obtaining character logs, the apparatus disclosed utilizes a conventional single transmitter two receiver logging tool. This type of tool normally utilizes magneto-strictive devices for the transmitting and receiving transducers. The logs obtained with this type of tool are satisfactory but greater accuracy and better detail would be desirable.

Accordingly, the principal object of the present invention is to provide a new and unique logging tool for obtaining accurate character logs.

A further object of this invention is to provide a new logging tool having means for selectively recording the slower arriving acoustical waves that have traveled over various distances of separation between the transmitters and the receiver.

A still further object of this invention is to provide a special logging tool for obtaining character logs, said tool utilizing a plurality of acoustic impulse transmitters that are spaced at different distances from a crystal type receiver having a resonant period that is significantly shorter than the time interval between the arrivals at the receiver of the compressional waves and the shear waves that are produced by the transmitters.

The above objects and other advantages of this invention are achieved by providing a logging tool having a single receiver and two or more transmitters disposed along a common axis with the transmitters being preferably located to one side of the receiver. The transmitters are spaced various distances from the receiver in order that the acoustical impulses may be transmitted over various distances to the receiver. The control of the transmitters and their firing sequence is determined by a programmer at the surface that is under the control of the operator of the logging tool. The receiver is preferably of the crystal type, the particular construction being shown in Patent No. 2,708,485. Likewise, the transmitters are of special construction being formed from an annular section of a magneto-strictive material having a coil of wire disposed thereon. The use of these particular types of receiver and transmitters provides very accurate logs of the slower arriving waves while the use of two or more transmitters and a single receiver provides means for readily varying the spacing between the transmitter and the receiver.

The above objects and advantages of this invention will be easily understood from the following detailed description of a preferred embodiment when taken in conjunction with the attached drawings in which.

Figure 1:
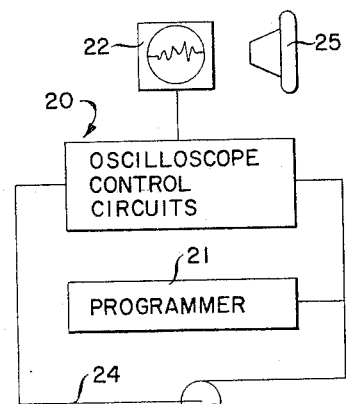
FIGURE 1 is a block diagram drawing of a logging tool having three transmitters constructed in accordance with this invention.
Figure 1:
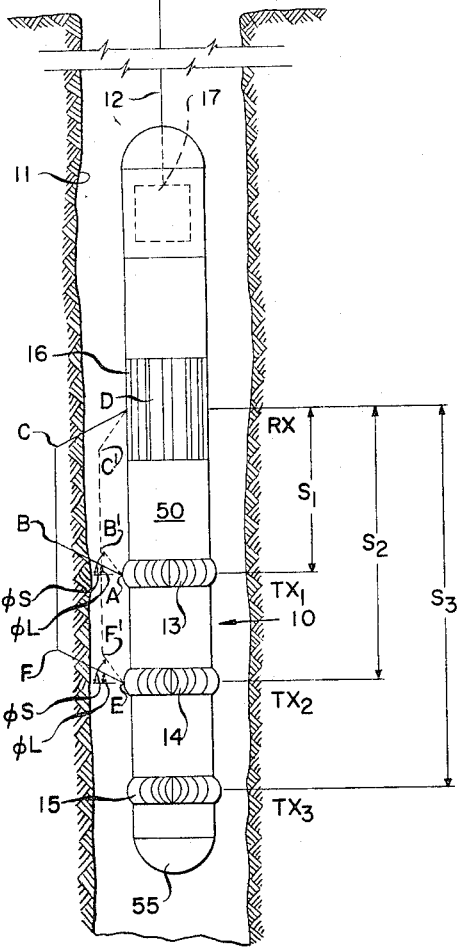

Referring now to FIGURE 1, there is shown a logging tool 10 disposed in the borehole 11 at the end of the logging cable 12. The logging tool 10 has three transmitting elements 13, 14 and 15 and a receiving element 16 disposed thereon along a common vertical axis, with the transmitting elements being positioned to one side of the receiving element. The transmitting elements 13, 14 and 15 are preferably spaced respectively four, five and six feet from the receiving element 16 although other spacings may be used. The transmitting elements are preferably mounted on a link member 50 constructed in accordance with the invention described in a copending application of C. B. Vogel and W. T. Lamb, Serial No. 705,352, filed December 26, 1957, and entitled "Coupling for Transducers in Well Logging Apparatus," now Patent No. 3,063,035. This construction is described in greater detail below with reference to FIGURE 3. The above structure provides for obtaining logs having four, five and six foot spacing by merely energizing one of the three transmitters. In addition, it is possible to energize the transmitters in succession to obtain conventional acoustic logs or multiple character logs. The use of three transmitters and a single receiver in addition eliminates the problem of cross-coupling the receiver signal on the cable 12 at any one time.

The downhole instrument 10 also includes suitable electronic components diagrammatically illustrated by the block 17 for amplifying the receiver signal as well as generating suitable pulses for energizing the transmitters 13, 14 and 15. The electronic components can also include circuits to control the operating cycle of the transmitters or the cycle may be controlled from the surface by a programmer as explained below. The downhole electronic components transmit the receiver signals to the uphole recording circuit over the cable 12. The uphole recording circuit is shown simply as an oscilloscope 22, a recording camera 25 and the oscilloscope control circuit 20. In addition, the cable 12 passes over a measuring sheave 23 that drives a suitable selsyn type unit not shown in FIGURE 1. The selsyn unit is coupled to the oscilloscope control circuit by a cable 24 to indicate on the oscilloscope 22 the depth at which the downhole tool is disposed. A permanent record of oscilloscope traces may be made by photographing the face of the oscilloscope by means of camera 25. Of course, other recording systems may be used, as for example those disclosed in the above-referenced copending application. The uphole circuitry in addition includes a programming device diagrammatically illustrated by the block 21. This programming device includes suitable circuitry for selectively energizing the downhole transmitter 13, 14 and 15. In addition the programmer should include circuitry for energizing a single transmitter and for energizing the transmitters in succession. Suitable circuitry would be for example cam-driven switches that energize the downhole transmitters singly or in sequence. Also, suitable electronic circuits having variable time delays could be used for energizing the downhole transmitters.

From the above description it is seen that a simplified downhole logging tool has been provided for obtaining accurate records of the slower arriving acoustical waves described in the above-referenced copending application. The downhole logging tool is simplified by utilizing three transmitters and a single receiver thus eliminating the need for any switching circuit for silencing one receiver to prevent cross-coupling of receiver signals as they are transmitted over the well logging cable. This permits the transmission of the complete signal from the receiver 16 and thus one may obtain a complete recording of the receiver signal for each of the various spacings between the receiver and the transmitters. The use of three transmitters provides a means whereby one may obtain acoustical logs over three different spacings.

Figure 2:
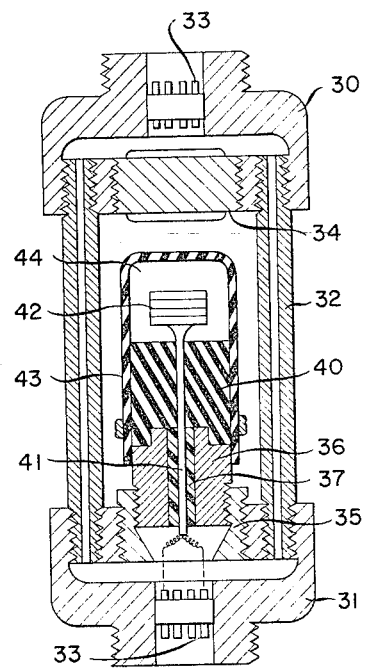
FIGURE 2 is a vertical section of a receiver element used in the logging tool shown in FIGURE 1.

The receiver 16 of FIGURE 1 is shown in greater detail in FIGURE 2 consists of similar upper and lower heads 30 and 31 having external threads for attachment to the other units of the downhole logging instrument 10. The two heads are held together a fixed axial distance from each other by means of a plurality of tubular members 32 circumferentially spaced around the periphery of the head. The central bore in each of the heads has disposed therein a plug type member having suitable prongs or terminals 33 to provide electrical connections for the various components of the downhole logging tool. The tubular members 32 serve as conduits for the various cables that serve to connect the components of the downhole logging tool together. The electrical connections for the various components are omitted from FIGURE 2 for the purpose of clarity. A bushing 34 serves to close the upper head 30 while a similar bushing 35 disposed in the lower head 31 serves as a mounting for the receiver. The bushing 35 carries a second bushing 36 having an insulated central portion 37. The upper end of the bushing 36 terminates in an insulating member 40 preferably formed of molded Neoprene or the like. An insulated conductor 41 passes through the bushing 37, the Neoprene member 40 and supports a receiver element 42 on its upper end. The receiver 42 is preferably formed as a pressure-sensitive element for example a stack of piezoelectric discs, each having a resonant period of about five milliseconds, a suitable piezo-electric material being tourmaline. The receiver element 42 is enclosed by a flexible plastic boot 43 that is clamped to the bushing 36 by suitable means not shown in the drawing. The space 44 surrounding the receiver 42 that serves as a housing for the receiver is preferably filled with an insulating fluid such as silicone grease or oil.

Figure 3:
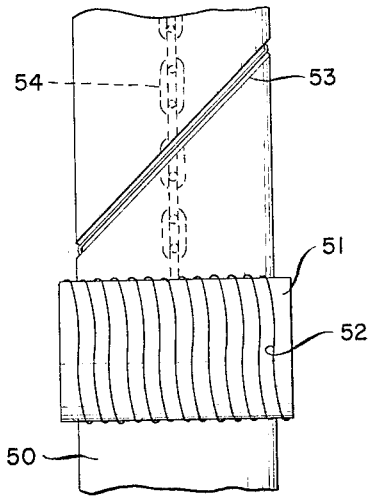
FIGURE 3 is an elevation view of a transmitter element used in the logging tool shown in FIGURE 1; and, FIGURES 4A and 4B illustrate the wave form of two signals obtained with the logging tool shown in FIGURE 1.

In FIGURE 3 there is shown the detailed construction of one of the transmitters used in the logging tool 10 of FIGURE 1. The transmitters are mounted on the link member 50 having a tension-bearing center member, as for example the chain 54. The chain 54 has at least some of its links electrically insulated from each other with the chain being embedded in a resilient material, as for example rubber. The link member 50 is made sufficiently long to support all of the transmitters with the upper end of the link member being secured to the receiver and the lower end being secured to an end piece 55 shown in FIGURE 1. The transmitting elements are positioned on the outer surface of the link member 50 and consist of a tubular section 51 of a piezo-electric material. A suitable material is barium titanate that will generate pressure waves when an electrical current is passed through the coil 52 disposed around the element 51. The coil 52 is wound around the element 51 with the coils being parallel with the central axis of the tool. The connections from the coils 52 to the remainder of the instrument are made by means of conductors 53 disposed in a spiral groove formed in the outer surface of the link member 50. The type of link member 50 shown is desirable since it absorbs the acoustic impulses generated by the transmitters that tend to travel up the link member instead of merely delaying them as is the case with most link structures. Of course, it is readily appreciated that all acoustical waves traveling from the transmitter directly to the receiver through the link member must be eliminated completely and not merely delayed. If the acoustic waves are merely delayed they would arrive at the transmitter at the same time as the later arriving waves and intermingle with the later arriving waves.

Figure 4A:
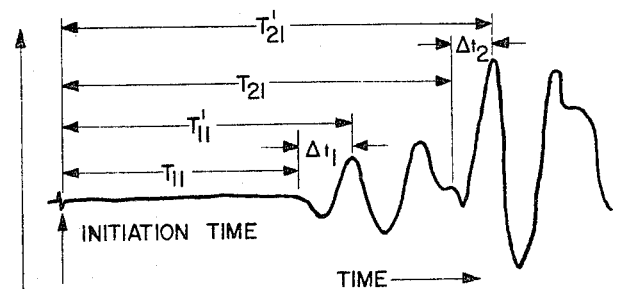
Figure 4B:
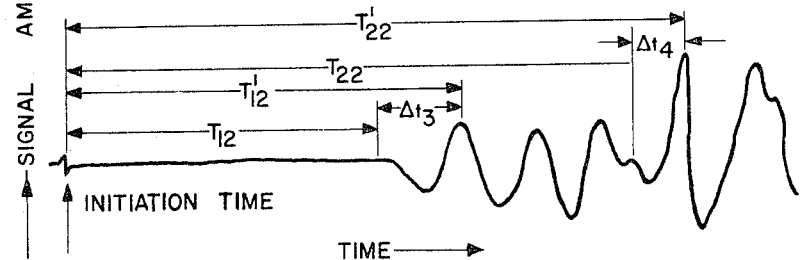

In FIGURE 4, there are shown receiver signals typically existing when a character log is run. Assume that the receiver 16 is located at depth $Z_1$ when transmitter 13 is fired and at depth $Z_2$ when transmitter 14 is fired. The depths of transmitters 13 and 14 at their times of firing are $Z_1 + S_1$ and $Z_2 + S_2$, respectively. As discussed above the first energy arrivals in each case travel refracted paths (denoted by ABCD and EFCD on FIGURE 1).

The first arrival travel times, $T_{11}$ and $T_{12}$ in FIGURE 4 will be, respectively $$T_{11} = \Delta T_{m11} + \frac{BC}{V_L} \qquad (1)$$

$$T_{12} = \Delta T_{m12} + \frac{FC}{V_L} \qquad (2)$$

where $V_L$ is the compressional wave velocity of the formation, $$\Delta T_{m11} = \frac{AB}{V_f} + \frac{CD}{V_f}, \quad \Delta T_{m12} = \frac{EF}{V_f} + \frac{CD}{V_f}$$

and $V_f$ is compressional wave velocity in the fluid. The angle $\phi_L$ (FIGURE 1) is determined by Snell's law for critical refraction, namely, $$\sin \phi_L = \frac{V_f}{V_L} \quad (3)$$

The shear arrival times ($T_{21}$ and $T_{22}$) are $$T_{21} = \Delta T_{m21} + \frac{B'C'}{v_s} \quad (4)$$

and $$T_{22} = \Delta T_{m22} + \frac{F'C'}{v_s} \quad (5)$$

where $$\Delta T_{m21} = \frac{AB'}{V_f} + \frac{C'D}{V_f}, \quad \Delta T_{m22} = \frac{EF'}{V_f} + \frac{C'D}{V_f}$$

and where sin $$\phi_S = \frac{V_f}{V_s}$$

and $v_s$ is the velocity of shear waves in the formation.

For practical purposes, it can be assumed that $BC = B'C' = S_1$, $FC = F'C' = S_2$, $\Delta T_{m11} = \Delta T_{m21}$, and $$\Delta T_{m12} = \Delta T_{m22}$$

With these assumptions, several relations among arrival times, receiver-transmitter spacings, and formation wave velocities can be derived.

Subtracting (1) from (4) and (2) from (5) yields $$T_{21} - T_{11} = S_1(1/v_s - 1/V_L) \quad (6)$$

and $$T_{22} - T_{12} = S_2(1/v_s - 1/V_L) \quad (7)$$

These relations form the basis for determining the quantity $(1/v_s - 1/V_L)$. If the actual arrivals of the compressional and shear waves can be identified, the quantity $(1/v_s - 1/V_L)$ can be determined from a single-spacing log without introducing errors from mud-travel times. This technique will usually only be applicable when the shear wave amplitude is significantly larger than the compressional wave amplitude so that the shear wave arrival can be conclusively identified.

Sometimes, it is necessary or convenient to pick the "arrival" times later in the wave forms than at the actual time of energy arrival (e.g. $T_{21}'$, $T_{11}'$, $T_{22}'$, $T_{12}'$ FIG. 4). Experience has shown that the apparent periods (e.g. time intervals between characteristic wave form factors such as peaks of character log wave forms are usually constant for the different transmitter-receiver spacings). For example in FIGURE 4 $\Delta t_4 = \Delta t_2$ and $\Delta t_3 = \Delta t_1$.

Now suppose that the shear wave arrival times had been assumed to be at $T_{21}'$ and $T_{22}'$ and the compressional wave arrival times at $T_{11}'$ and $T_{12}'$. Then, $$T_{21}' - T_{11}' = S_1(1/v_s - 1/V_L) + \Delta t_2 - \Delta t_1 \quad (8)$$

and $$T_{22}' - T_{12}' = S_2(1/v_s - 1/V_L) + \Delta t_4 - \Delta t_3 \quad (9)$$

Subtracting (8) from (9) yields $$(T_{22}' - T_{12}') - (T_{21}' - T_{11}') = (S_2 - S_1)\left(\frac{1}{v_s} - \frac{1}{V_L}\right) + (\Delta t_4 - \Delta t_2) + (\Delta t_1 - \Delta t_3) \quad (10)$$

As mentioned above, experience has shown that $\Delta t_4 = \Delta t_2$ and $\Delta t_3 = \Delta t_1$, so that (10) reduces to $$(1/v_s - 1/V_L) = \frac{(T_{22}' - T_{12}') - (T_{21}' - T_{11}')}{S_2 - S_1} \quad (11)$$

The Equation 11 is the basic relation we have used to determine the quantity $(1/v_s - 1/V_L)$ from multi-spacing character logs.

The Equation 11 also forms the basis for identifying the shear wave arrival when the amplitude contrast between compressional and shear waves is not conclusive. The quantity $(T_{22}' - T_{12}') - (T_{21}' - T_{11}')$ is zero if the peaks at which the times are all taken are ahead of the actual shear arrivals. Therefore, if there is some doubt as to the location of the shear arrival, the following procedure is followed:

(1) Take $T_{21}'$ and $T_{22}'$ at the first peaks after $T_{11}$ and $T_{12}$.

(2) If $(T_{22}' - T_{12}) - (T_{21}' - T_{11})$ is approximately zero, the peaks selected are both within the compressional part of the wave train. In this case, take $T_{21}'$ and $T_{22}'$ at the second peaks after $T_{11}$ and $T_{12}$: Repeat this process, moving back into the wave forms, peak by peak, until $(T_{22}' - T_{12}) - (T_{21}' - T_{11})$ is significantly different than zero. This locates the first peak in the shear arrival at the smaller spacing. The process is repeated with the wave forms corresponding to the spacings $S_2$ and $S_3$ to locate the first peak in the shear arrival on the wave form corresponding to the spacing $S_2$.

(3) Once the first shear peaks are located on the wave forms for spacings $S_1$ and $S_2$, proceed as discussed above Equation 11 to calculate $(1/v_s - 1/V_L)$.

The above techniques may also be used to determine the difference $(1/v_f - 1/V_L)$, $(1/V_t - 1/V_L)$, and $(1/V_t - 1/v_s)$ where $V_f$ is compressional fluid velocity and $V_t$ is the velocity of the "low velocity" wave (Stonely or "tube" wave). The techniques are applicable even when hole size changes occur and/or the centralization of the tool in the hole changes between transmitter firings.

Once the values of $(1/v_s - 1/V_L)$, $(1/v_f - 1/V_L)$ and $(1/V_t - 1/V_L)$ are determined, they can be added to the value at the appropriate depth of $1/V_L$ obtained from a multi-receiver curve-plotted log to obtain values of $1/v_s$, $1/V_f$ and $1/V_t$.

If the hole size and tool centralization are constant and if there are not relative "instrumentation" time delays, then $1/V_L$ can also be determined from the character log records by subtracting (1) from (2), since for these conditions $\Delta T_{m11} = \Delta T_{m12}$ and $$T_{12} - T_{11} = (S_2 - S_1)1/V_L \quad (12)$$

For maximum ease of interpretation of the velocity data obtained as described above, the logging speed is usually adjusted so that all three transmitters fire at the same depth in the hole.

From the above description of a preferred embodiment of this invention it is seen that the invention provides a relatively simple downhole tool that is capable of obtaining accurate logs of the later arriving acoustical waves. These results are accomplished by using a very sensitive crystal type receiver in combination with three spaced transmitters. The use of a plurality of transmitters is preferred to a plurality of receivers since it eliminates the possibility of receiver signals countermingling as they are transmitted up the cable to the surface recording instrument. The spacing between the receiver and the various transmitters may vary although a spacing of four, five and six feet, respectively, has been found to provide satisfactory results. As explained, the transmitters may be fired selectively in sequence or a single transmitter selected. The transmitters can also be fired sequentially at a rate related to the travel speed of the downhole tool through the borehole. When this is done it is possible to obtain logs over the complete length of the borehole. Also, by using the signals that were originated by the sound impulses from two different transmitters one can obtain a conventional type of acoustical velocity well logging having an effective spacing equal to the spacing between the two transmitters.

We claim as our invention:

1. A method for identifying the wave arrival times in an acoustical logging signal comprising:

obtaining at least two acoustical logging signals, each signal having a different transmitter receiver spacing;

converting each of the acoustical logging signals to a graphic record in which amplitude versus time;

selecting the first peak in each graphic record of two signals and denoting the peaks as $T_{11}$ and $T_{12}$, respectively, and selecting the next succeeding peak after the first peak in each graphic record of the said two signals and denoting the succeeding peaks as $T_{21}'$ and $T_{22}'$;

measuring the time difference between $(T_{22}'-T_{21}')$ and $(T_{12}-T_{11})$;

and continuing to select the next succeeding peak in each graphic record of the two signals and obtaining the time difference as above until the time difference is significantly different than zero, the succeeding peak giving a time difference significantly different than zero corresponding to the arrival of the first shear wave in the signal of said two signals having the shortest transmitter receiver spacing.

2. A method for identifying the wave arrival times in an acoustical logging signal comprising:

obtaining at least two acoustical logging signals, each signal having a different transmitter receiver spacing;

selecting the first peak of each of two of said signals, then selecting the next succeeding peak after the first peak in each of said two signals;

measuring the time difference between a quantity equal to the time difference between the second peak of the signal of said two signals having the longest transmitter-receiver spacing and first peak of said signal and a quantity equal to the time difference between the second peak of the other signal of said two signals and the first peak of said other signal;

and continuing to select the next succeeding peak in each signal and obtaining the difference as above until the difference is significantly different than zero, the succeeding peak giving a difference significantly different than zero corresponding to the arrival of the first shear wave peak in the acoustical logging signal having the shortest transmitter-receiver spacing.

References Cited by the Examiner
UNITED STATES PATENTS

| | | | |
|---|---|---|---|
| 3,062,314 | 11/1962 | Vogel et al. | 340—15.5 |
| 3,090,940 | 5/1963 | Vogel | 340—18 |
| 3,147,458 | 9/1964 | Wagner | 340—15.5 |
| 3,152,314 | 10/1964 | Mut | 340—15.5 |
| 3,172,078 | 3/1965 | Mazzagatti | 340—17 |
| 3,182,722 | 5/1965 | Vogel | 181—.5 |
| 3,188,607 | 6/1965 | Woodworth | 340—17 |

BENJAMIN A. BORCHELT, *Primary Examiner.*

R. M. SKOLNIK, *Assistant Examiner.*